United States Patent
de Queiroz (10) Patent No.: US 6,611,626 B1
(45) Date of Patent: Aug. 26, 2003

(54) METHOD OF COMPRESSING JPEG FILES USING A CONDITIONAL TRANSFORM

(75) Inventor: Ricardo L. de Queiroz, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/458,855

(22) Filed: Dec. 10, 1999

(51) Int. Cl.[7] .............................. G06K 9/36; G06K 9/46
(52) U.S. Cl. ....................... 382/239; 382/250; 382/248; 258/426.16
(58) Field of Search ................................ 382/232, 233, 382/239, 248, 250, 251; 375/240.02, 240.18, 240.2; 358/426.02, 426.04, 426.16

(56) References Cited

U.S. PATENT DOCUMENTS

| 5,642,438 A | 6/1997 | Babkin ..................... 382/250 |
| 5,699,170 A | 12/1997 | Yokose et al. .............. 358/426 |
| 5,737,450 A | 4/1998 | Hajjahmad et al. ......... 382/260 |
| 5,745,251 A | 4/1998 | Yamagami .................. 358/426 |
| 5,812,195 A * | 9/1998 | Zhang .................... 375/240.16 |
| 5,867,598 A | 2/1999 | de Queiroz ................. 382/235 |
| 6,356,663 B1 * | 3/2002 | Korta et al. ................ 382/239 |

* cited by examiner

*Primary Examiner*—Timothy M. Johnson
*Assistant Examiner*—Ali Bayat
(74) *Attorney, Agent, or Firm*—Christopher D. Wait (57) ABSTRACT

A method for compressing digital image data to improve the efficiency of serial data transmission is disclosed. More specifically, the present invention accomplishes image compression by performing the most complex portions of a standard compression technique on a subset of the originally provided data utilizing a modified two-dimensional discrete cosine transform. The invention includes a fast JPEG compressor using a Haar transform with a conditional transform.

25 Claims, 8 Drawing Sheets

| P 00 | P 01 | P 02 | P 03 | P 04 | P 05 | P 06 | P 07 |
|---|---|---|---|---|---|---|---|
| P 10 | P 11 | P 12 | P 13 | P 14 | P 15 | P 16 | P 17 |
| P 20 | P 21 | P 22 | P 23 | P 24 | P 25 | P 26 | P 27 |
| P 30 | P 31 | P 32 | P 33 | P 34 | P 35 | P 36 | P 37 |
| P 40 | P 41 | P 42 | P 43 | P 44 | P 45 | P 46 | P 47 |
| P 50 | P 51 | P 52 | P 53 | P 54 | P 55 | P 56 | P 57 |
| P 60 | P 61 | P 62 | P 63 | P 64 | P 65 | P 66 | P 67 |
| P 70 | P 71 | P 72 | P 73 | P 74 | P 75 | P 76 | P 77 |

| DCC 00 | ACC 01 | ACC 02 | ACC 03 | ACC 04 | ACC 05 | ACC 06 | ACC 07 |
|---|---|---|---|---|---|---|---|
| ACC 10 | ACC 11 | ACC 12 | ACC 13 | ACC 14 | ACC 15 | ACC 16 | ACC 17 |
| ACC 20 | ACC 21 | ACC 22 | ACC 23 | ACC 24 | ACC 25 | ACC 26 | ACC 27 |
| ACC 30 | ACC 31 | ACC 32 | ACC 33 | ACC 34 | ACC 35 | ACC 36 | ACC 37 |
| ACC 40 | ACC 41 | ACC 42 | ACC 43 | ACC 44 | ACC 45 | ACC 46 | ACC 47 |
| ACC 50 | ACC 51 | ACC 52 | ACC 53 | ACC 54 | ACC 55 | ACC 56 | ACC 57 |
| ACC 60 | ACC 61 | ACC 62 | ACC 63 | ACC 64 | ACC 65 | ACC 66 | ACC 67 |
| ACC 70 | ACC 71 | ACC 72 | ACC 73 | ACC 74 | ACC 75 | ACC 76 | ACC 77 |

| QDCC 00 | QACC 01 | QACC 02 | QACC 03 | QACC 04 | QACC 05 | QACC 06 | QACC 07 |
|---|---|---|---|---|---|---|---|
| QACC 10 | QACC 11 | QACC 12 | QACC 13 | QACC 14 | QACC 15 | QACC 16 | QACC 17 |
| QACC 20 | QACC 21 | QACC 22 | QACC 23 | QACC 24 | QACC 25 | QACC 26 | QACC 27 |
| QACC 30 | QACC 31 | QACC 32 | QACC 33 | QACC 34 | QACC 35 | QACC 36 | QACC 37 |
| QACC 40 | QACC 41 | QACC 42 | QACC 43 | QACC 44 | QACC 45 | QACC 46 | QACC 47 |
| QACC 50 | QACC 51 | QACC 52 | QACC 53 | QACC 54 | QACC 55 | QACC 56 | QACC 57 |
| QACC 60 | QACC 61 | QACC 62 | QACC 63 | QACC 64 | QACC 65 | QACC 66 | QACC 67 |
| QACC 70 | QACC 71 | QACC 72 | QACC 73 | QACC 74 | QACC 75 | QACC 76 | QACC 77 |

METHOD OF COMPRESSING JPEG FILES USING A CONDITIONAL TRANSFORM

RELATED CASES

Cross reference is made to the following application incorporated by reference herein for its teaching: U.S. patent application Ser. No. 09/119,023 entitled "Improved Method Of Compressing JPEG Files" to Ricardo L. de Queiroz.

BACKGROUND OF THE INVENTION AND MATERIAL DISCLOSURE STATEMENT

The transmission of electronic data via facsimile machines and similar devices has become quite common. Efforts to transmit significantly larger volumes of this data within a substantially shortened period of time are constantly being made. This is true not only to allow for data to be sent from one location to another at faster speeds and thereby causing less inconvenience to the user, but to enable more complex data to be transmitted between the same locations without drastically increasing the required transmission time. For example the facsimile transmission time for a detailed halftoned image will be many times more than that of a simple sheet of black text on a white page when using the same fax machine. By the same token, fax transmission of a color image will require an even greater amount of time than its greatly detailed halftoned counterpart.

Without any form of data reduction, transmission of color image data files via facsimile would require extensive resources—very fast modems and/or large buffers—and would still take a great deal of time, thereby causing such transmission to become very expensive and therefore, impractical. Instead, the transmission of color image data via fax is typically accomplished using some form of data compression prior to transmission.

The JPEG (Joint Photographic Experts Group) standard provides a well known method of compressing electronic data. JPEG uses the discrete cosine transform (DCT) to map space data into spatial frequency domain data. Simply put, the first step in JPEG compression is to transform an 8×8 block of pixels into a set of 8×8 coefficients using the DCT. The DCT with the lowest frequency is referred to as the DC coefficient (DCC), and the remaining coefficients are AC coefficients (ACCs). The DCC and ACCs are quantized—divided by an integer referred to as the "step size" and rounded to the nearest whole number. The losses that occur during JPEG compression typically occur during the quantization step. The magnitude of this loss is obviously dependent upon the step size selected and the resulting amount of round-off required to perform quantization.

Next, the quantized coefficients are arranged in a one dimensional vector by following a selected path (i.e. zigzag) through the 8×8 block of quantized coefficients. The DCC is typically the first value in the vector. Ordinary JPEG compression typically includes replacing the quantized DCC with the difference of its actual value minus the DCC of the previous block, to provide a differential DCC. Finally, the vector is encoded into a bit stream through a sequence of Run Length Counting (RLC) operations, combined with Variable Length Codes (VLC) to produce a compressed data stream.

Fax transmission of color image data is often accomplished by scanning the image at the sending fax to generate digital color image data, subjecting this digital color image data to JPEG compression and then transmitting the compressed digital color image data over telephone lines to the receiving fax. Since color image data is so complex, high compression ratios must usually be applied in order to complete the transmission within an acceptable time frame. High compression ratios lead to more data loss, which typically occurs at the higher end of the frequency range. Further, the imaging devices typically included with fax machines in the lower end of the market usually include thermal ink-jet printers and would likely use error diffusion halftoning techniques. The halftoning that occurs when using a thermal ink jet printer results in an additional loss of high frequency data. Thus, much of the detail in the original image that is preserved and transmitted will never actually be viewed by the ultimate user.

The "sending" portion of fax transmission includes scanning the original image, generation of a corresponding digital image, and any one of a number of data reduction techniques, most notably some form of data compression. Once these steps are completed, the compressed data is transmitted serially to the receiving fax in a bit stream. The length of the bit stream used to describe the image is inversely proportional to the amount of compression that has been applied. Thus, if the compression ratio is large the length of the bit stream used to describe the image will be very short, resulting in a substantial reduction in the transmission time for the data stream.

With this in mind, successful fax transmission requires a proper correspondence between the compression ratio being applied to the image and the clock speed of CPU of the sending fax. In other words, if the compression ratio is smaller than necessary for a given CPU speed the data will have to wait to be transmitted, and an appropriately sized buffer will be required. On the other hand, if the compression ratio is high relative to the CPU speed the modem will become idle waiting for the CPU to complete image processing and transmit more data. Since modems are typically configured to detect a large lapse in data transmission as the end of transmission, this large gap typically causes them to disconnect. Thus, it is advantageous to continue the stream of data from the sending fax to the receiving fax, and eliminate gaps in the data stream. One way to do this is obviously to implement a faster JPEG compressor which can keep the data moving through the modem even if a high compression ratio is used. However, this solution results in significant cost increases and is often impractical. Thus, it is advantageous to provide a continuous stream of data during transmission of a color facsimile by implementing a faster data compressor without having to resort to the purchase of more expensive equipment.

The following disclosures may be relevant to aspects of the present invention:

U.S. Pat. No. 5,737,450 to Hajjahmad et al. issued Apr. 7, 1998 discloses a method and apparatus for applying an image filter to an image signal where image data terms, corresponding to the image signal, are converted by means of an overlapping operation and a scaled forward orthogonal transformation to form frequency coefficient matrices, the image filter is converted by means of a descaled orthogonal transformation to form a descaled frequency filter matrix, and the frequency coefficient matrices are multiplied by the descaled frequency filter matrix to form filtered coefficient matrices for conversion into a filtered image signal by means of an inverse orthogonal transformation process.

U.S. Pat. No. 5,699,170 to Yokose et al. issued Dec. 16, 1997, discloses an image communication system wherein transmission of an image between an image transmission apparatus and an image reception apparatus which include image output sections having different performances can be performed without making an inquiry for the performance prior to transmission is disclosed. An image is inputted by an image input section and sent to a hierarchization section in the image transmission apparatus. The hierarchization section converts the inputted image into hierarchic communication data and transmits hierarchized data to a selection section of the image reception apparatus. The selection section extracts only necessary data from the hierarchic communication data transmitted thereto in accordance with the performance of an image output section of the image reception section and then sends the necessary data to the image output section after, if necessary, they are converted into image data. The image output section visualize the image data transmitted thereto from the selection section.

U.S. Pat. No. 5,642,438 to Babkin issued Jun. 24, 1997 discloses image compression implementing a fast two-dimensional discrete cosine transform. More specifically, Babkin discloses a method and apparatus for the realization of two-dimensional discrete cosine transform (DCT) for an 8×8 image fragment with three levels of approximation of DCT coefficients. "JPEG: Still Image Compression Standard", New York, N.Y., Van Nostrand Reinhold, 1993 by W. B. Pennebaker and J. L. Mitchell.

All of the references cited herein are incorporated by reference in their entirety for their teachings.

Accordingly, although known apparatus and processes are suitable for their intended purposes, a need remains for image compression implementing a two-dimensional discrete cosine transform using a fast JPEG compressor based on a modified two-dimensional discrete cosine transform to compress digital image data thereby improving the efficiency of serial data transmission.

SUMMARY OF THE INVENTION

The present invention relates to a method of improving the speed and efficiency of electronic data compression. The method comprises obtaining input image data which includes discrete values that represent light intensity in an image. Then applying a first transform to the input image data to produce a first transform result. This is followed by comparing the first transform result to a threshold. Finally, a either second transform is applied to the first transform result, or the substitution of a zero value for the first transform result is used to generate approximation data.

In accordance with another aspect of the invention there is provided a method of transmitting a facsimile of an original image from a sending location to a receiving location. The method comprises acquiring the original image and generating digital image data therefrom, wherein the digital image data includes pixel values which represent the light intensity of the original image. Then applying a first transform to the input image data to produce a first transform result. This is followed by comparing the first transform result to a threshold. Then in generating approximation data which provides an estimated value of image light intensity, either a second transform is applied to the first transform result, or a zero value is substituted for the first transform result. Finally the output image data is derived from the approximation data.

BRIEF DESCRIPTION OF THE DRAWINGS

Other features and advantages of the present invention will become apparent as the following description proceeds and upon reference to the drawings, in which.

DETAILED DESCRIPTION OF THE PREFERRED EMBODIMENT

The present invention is directed to a method and apparatus for compressing complex digital image data to enhance the efficiency of data transmission.

Figure 1:
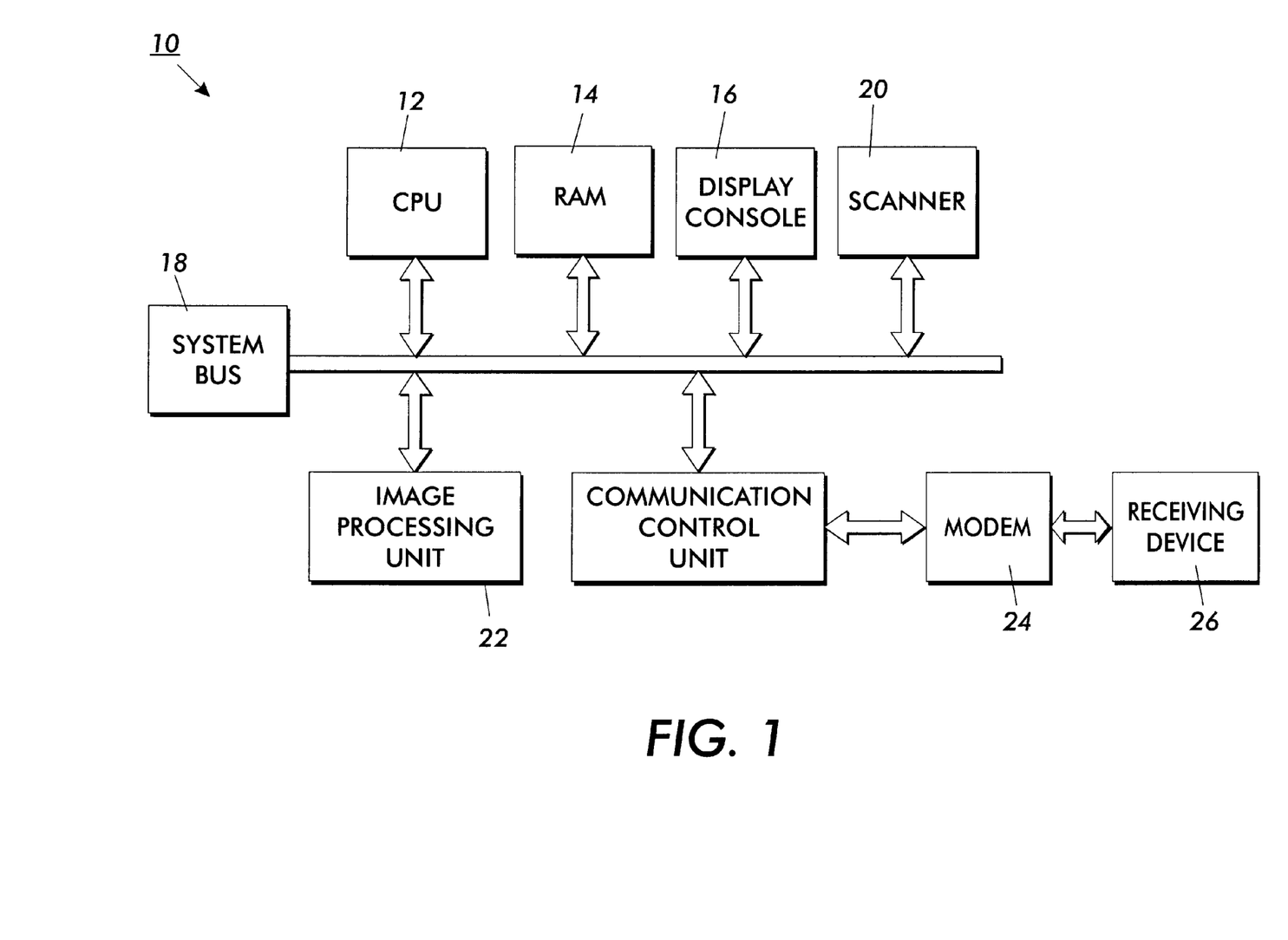
FIG. 1 is a generalized block diagram illustrating general aspects of a facsimile machine that may be used to practice the present invention.

Referring now to the drawings where the showings are for the purpose of describing an embodiment of the invention and not for limiting same, FIG. 1 is a block diagram showing structure of an embodiment of a facsimile (fax) apparatus 10 according to the present invention. Fax 10 includes a CPU 12 for executing controlling processes and facsimile transmission control procedures, a RAM 14 for controlling programs and a display console 16 with various buttons and/or switches for controlling the facsimile apparatus and LCDs or LED's for reviewing the status of system operation. A scanner 20 is also included for acquiring an original image and generating image data therefrom. Image processing unit 22 is included to perform encoding and decoding (compression and decompression) processes between an image signal and transmitted codes. Significantly for purposes of this invention, fax 10 includes or interfaces with a modem 24, which is a modulating and demodulating device that transmits and receives picture information over telephone lines to a compatible receiving device 26, such as another facsimile machine, a printer, computer terminal or similar apparatus.

Figure 2:
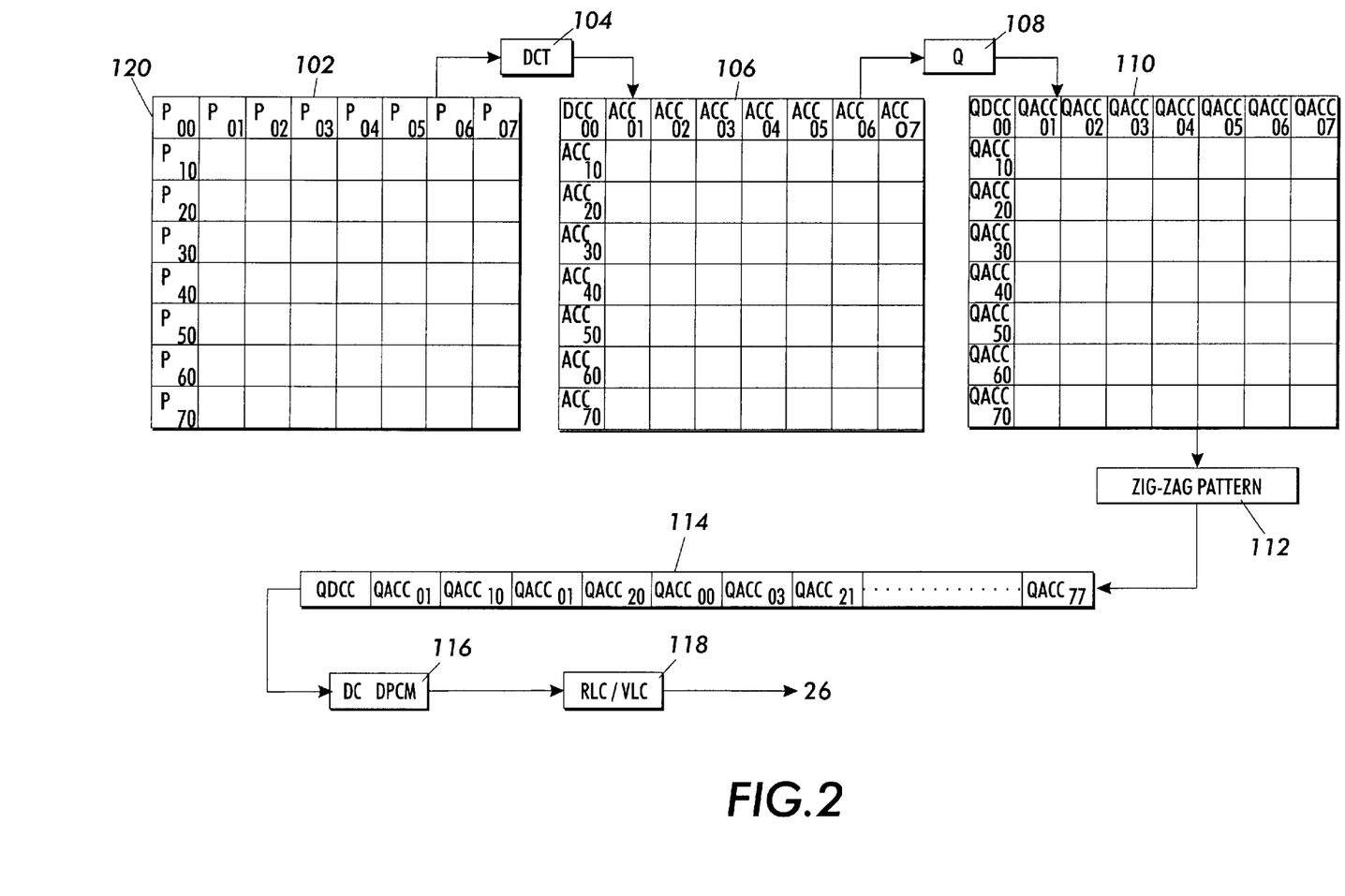
FIG. 2 contains a schematic illustration of the steps used to carry out a JPEG compression scheme.

As stated above, image processing unit 22 is used to compress and decompress image signals and transmitted codes. One common method of compressing and decompressing image signals is through use of the JPEG (Joint Photographic Experts Group) standard described in detail with reference to FIG. 2. An original image is scanned by fax 10 to generate a corresponding digital image. The digital image is separated into 8×8 blocks 102 of picture elements 120 or "pixels" which indicate the intensity of the light that is measured at discrete intervals throughout the surface of the page. For example, a spot that is covered with black ink will not reflect any light. The value of the pixel 120 will typically be 0 at that location. On the other hand, a spot that is completely uncovered by ink will reflect the color of the page on which the image resides. Assuming the sheet paper on which the image has been placed is white, the measured light intensity of the pixel 120 would be 1 at that spot. Gray areas, such as those which represent color or black and white halftoned areas of the image would register a light intensity somewhere between 0 and 1. The values of the pixels 120 in block 102 are transformed through DCT into a set 106 of 8×8 coefficients as indicated in step 104. The DCT coefficient with the lowest frequency is referred to as the DC coefficient (DCC), and the remaining coefficients are AC coefficients (ACCs). The DCC and ACCs are quantized—each coefficient is divided by a predetermined whole number referred to as the "step size" at step 108 and then a selected pattern (usually a "zigzag") is followed through the 8×8 block of quantized coefficients 110 as indicated in step 112 to place the coefficients in a desired order in a one dimensional vector 114. The quantized DCC is typically the first value of the vector 114, and is represented differentially as the actual DCC value minus the DCC of the previous block as shown in block 116. Vector 114 is encoded into a bit stream through a sequence of Run Length Counting (RLC) operations which count the number of zero ACCs that reside in the path before a non-zero ACC. These RLC operations are combined with Variable Length Codes (VLC) as indicated in block 118 which encode a symbol that includes a combination of the number of zeros preceding a non-zero ACC and the ACC amplitude. This encoding produces a compressed data stream which can be transmitted to receiving device 26 over communication lines.

Figure 3:
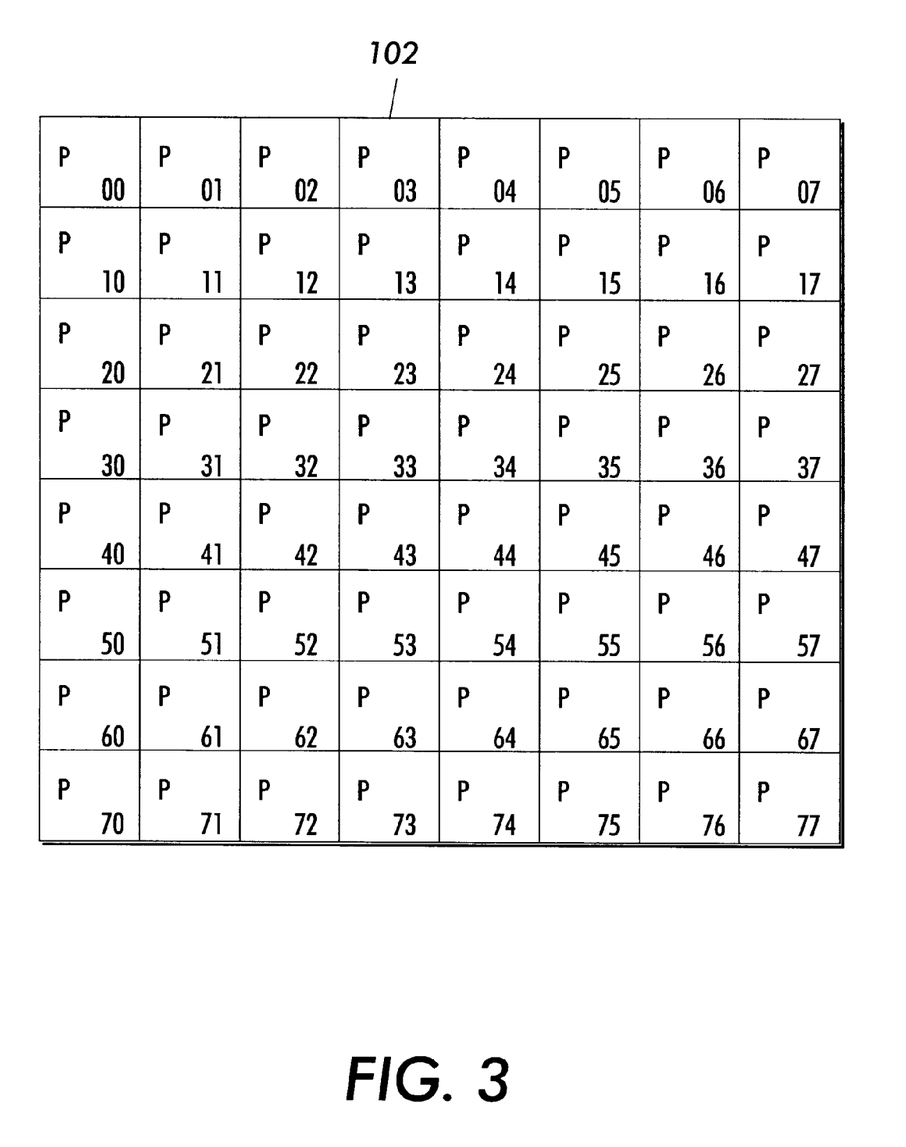
FIG. 3 is a detailed illustration of an example of a labeling configuration of an 8×8 block of pixels.
Figure 4:
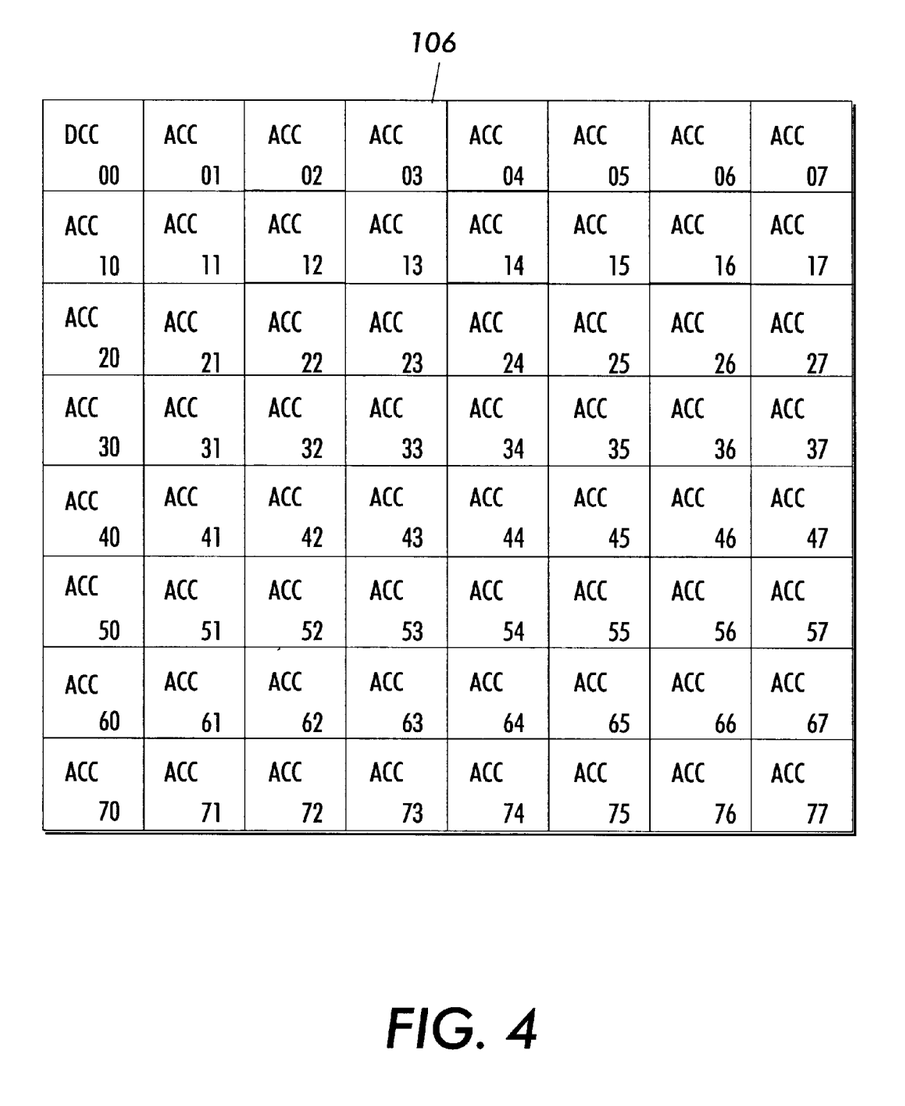
FIG. 4 contains a detailed illustration of the labeling configuration of DCT coefficients obtained by application of a discrete cosine transformation to the 8×8 block of pixels illustrated in FIG. 3.
Figure 5:
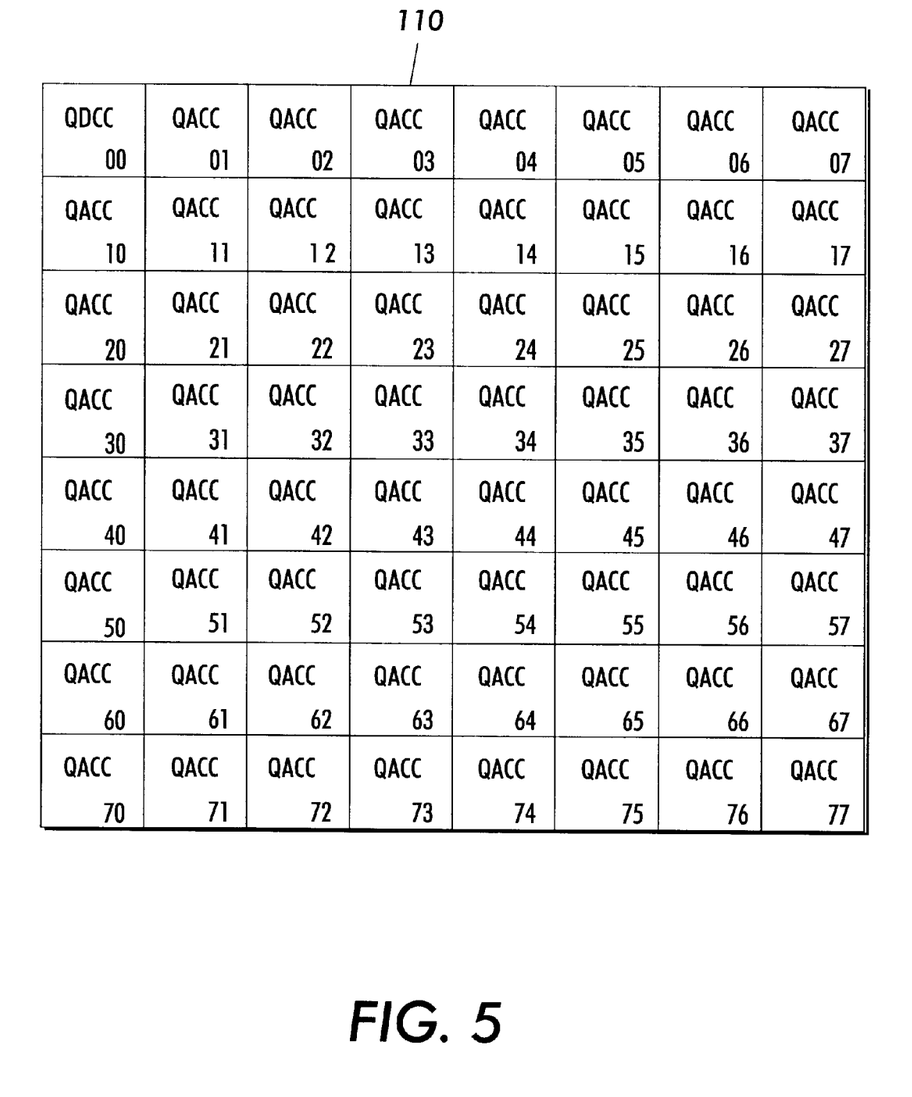
FIG. 5 illustrates one example of the manner in which the DCT coefficients of FIG. 4 may be labeled after quantization.

FIG. 3 contains a detailed illustration of an 8×8 block of pixels 120 and the labeling configuration that will be used throughout the description of the present invention. It should be noted here that pixels 120 and pixel blocks 102 can be labeled in numerous other ways and it is not intended to imply that either JPEG compression or the present invention are limited to the ordering scheme shown here. Similarly, FIGS. 4 and 5 contain detailed illustrations of the unquantized and quantized DCT coefficients respectively that correspond to the 8×8 block 102 of pixels 120 illustrated in FIG. 3. Again, neither standard JPEG compression or the present invention are limited to these embodiments.

Figure 6:
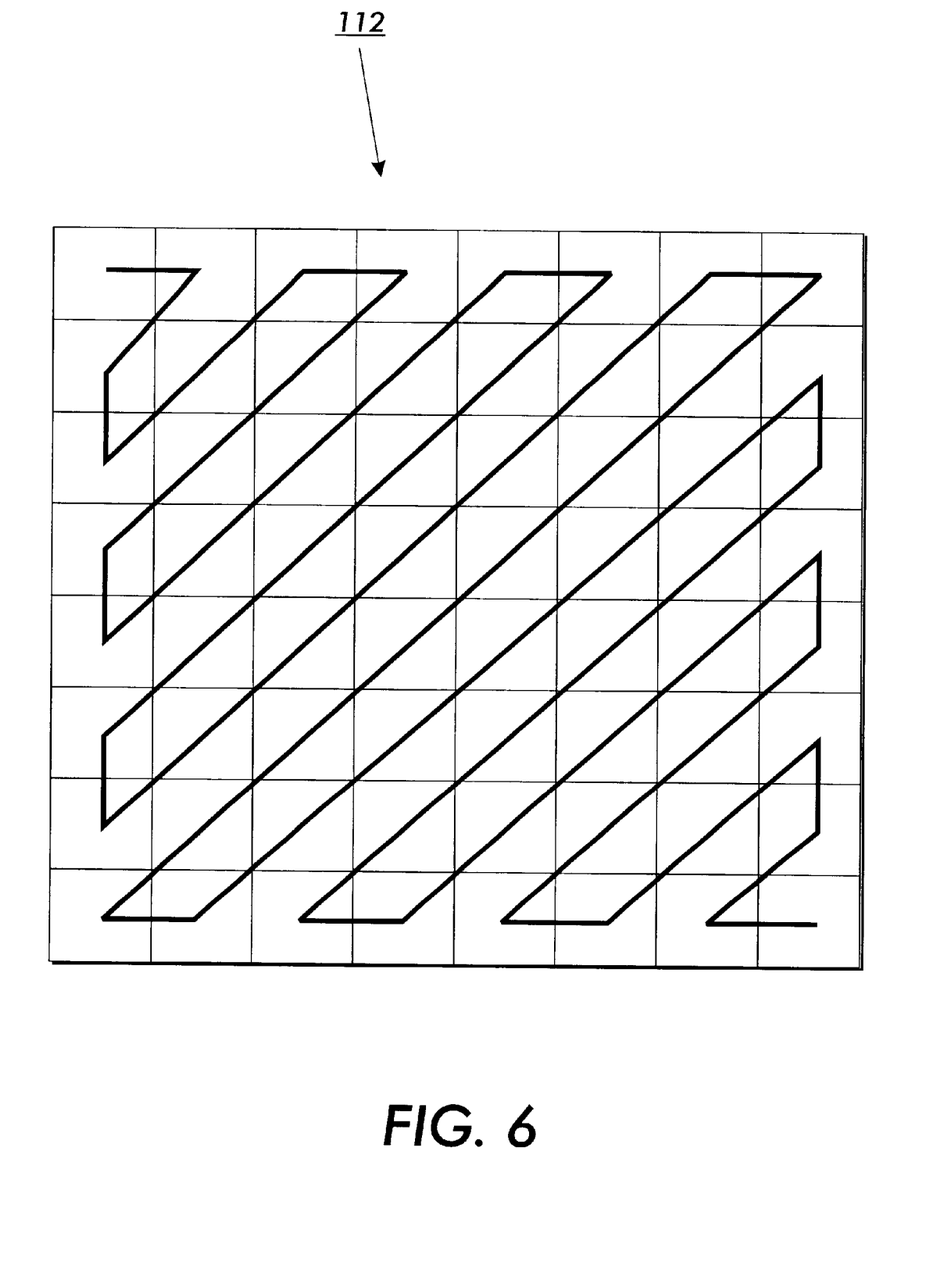
FIG. 6 depicts a "zig zag" pattern, one embodiment of the manner in which quantized pixels may be selected for placement into a one dimensional vector.

FIG. 6 contains a detailed illustration of one pattern 112 in which the quantized DCT coefficients may be selected for placement into one dimensional vector 114. As those skilled in the at will recognize, the illustration shown in FIG. 6 merely shows one of many possible zigzag coefficient selection patterns 112 that may be followed in order to practice the present invention.

Figure 7:
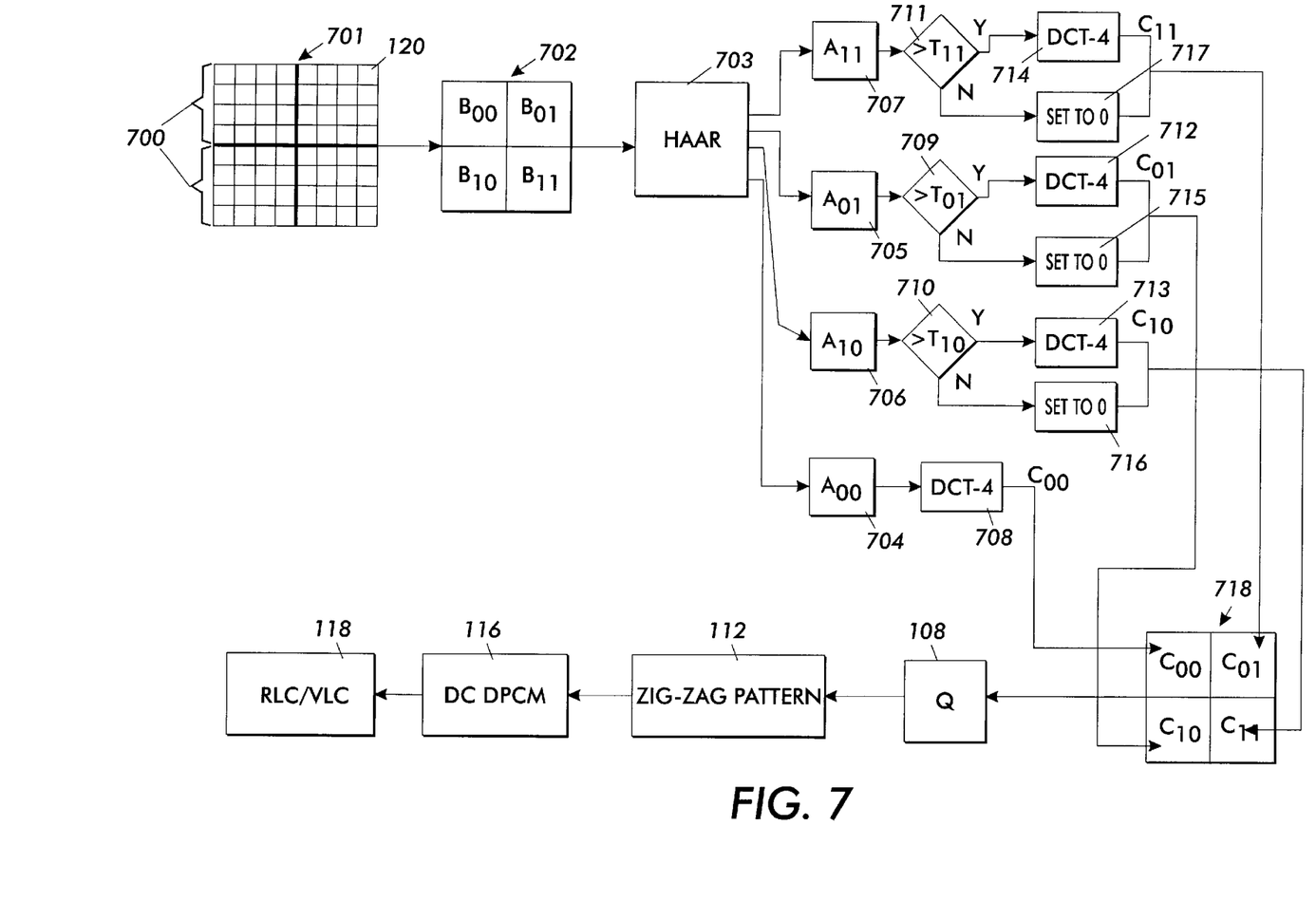
FIG. 7 contains a schematic illustration of one way the present invention may be implemented in a JPEG compression technique.

Referring now to FIG. 7, generally speaking the present invention includes performing a portion of the JPEG compression method on a reduced set of data, without producing a substantial loss in the quality of the output image. The invention takes advantage of the fact that a 4-point DCT can be performed more quickly than an 8-point DCT can. As is well known in the art, JPEG achieves compression because most DCT coefficients in a block after quantization are zero. The present invention saves time by not computing zero coefficients. It is also known that a certain amount of high frequency loss can be tolerated particularly with color separation data or in a fax environment. The invention identifies and examines high band pass information for activity. Low activity blocks below a threshold as identified by the invention need not have a DCT coefficient calculated. Instead a zero value is substituted. This also allows the invention to save computation time.

In FIG. 7 as with the standard JPEG method described above, the scanned image is separated into blocks 701 of pixels 120 which indicate the intensity of the light at the various locations of the image. As before, an 8×8 block of pixels has shown to be very successful when used with the present invention. However, other pixel block dimensions are possible and the invention is not limited to this embodiment. Those skilled in the art will recognize that a smaller or larger block size might be chosen when it is desired to preserve more or less image detail. In fact it should be noted that while the horizontal and vertical dimensions are identical in the embodiment of pixel block 701 described here, this is not a requirement for practicing the present invention. For example, a non-square block might be chosen if the is image was generated for a device possessing asymmetric resolutions in the vertical and horizontal directions.

Once a pixel block 701 having the appropriate size and dimensions is chosen, block 701 must be segmented into sub-blocks 700 as indicated in FIG. 7. In a preferred embodiment, an 8×8 block of pixels is used to practice the invention, segmenting pixel block 701 into 4 sub-blocks 700, where each sub-block 700 is an array having four pixels 120 in the horizontal direction and four pixels 120 in the vertical direction. Those of ordinary skill in the art will recognize that if the user of the invention wishes to sacrifice some image reproduction accuracy in order to save costs, other array sizes might be used. If the user wishes to obtain higher image reproduction accuracy in some areas of the image, but requires less accuracy in other areas, a fine grid could be applied to some areas with a larger grid applied to other areas. Again, it is intended to embrace all such alternatives, and the invention is not limited to the examples provided here.

With continued reference to FIG. 7, each of the above described sub-blocks 700 shown in block 701 are labeled in block 702. Each illustrated sub-block 700 is now represented as $B_{00}$, $B_{01}$, $B_{10}$, and $B_{11}$ in block 702. In a preferred embodiment a Haar transform 703 is performed upon the data in block 702. A Haar transform is a technique well understood in the art as performing a matrix sum and difference operation. The Haar transform provides quadrant results $A_{00}$, $A_{01}$, $A_{10}$, $A_{11}$ in the 8×8 quadrant blocks 704, 705, 706, and 707, respectively. Using the 4×4 Haar transform operation here separates out low pass band and high pass band components for subsequent operation.

In quadrant block 704 the $A_{00}$ result provides the low pass band information. Because low pass band information is essential for successful reconstruction of an image, the $A_{00}$ result is subsequently transformed by a 4-point DCT operation 708. The $A_{01}$, $A_{10}$, $A_{11}$ quadrant results constitute higher frequency or high pass band information. Therefore, for quadrant results $A_{01}$, $A_{10}$, $A_{11}$ as found in quadrant blocks 709, 710, and 711 respectively, a comparison is made to a threshold value $T_{01}$, $T_{10}$, $T_{11}$ respectively. The comparison of the quadrant results to a threshold is provided for in decision blocks 709, 710, and 711. Threshold table 802 as found in FIG. 8 and described below, is utilized for supplying the threshold values used in the decision blocks 709, 710, and 711. If a given high pass band quadrant result is found to be above a particular threshold value, it is deemed as having enough information to warrant 4-point DCT transformation at DCT-4 block 712, 713 and 714 respectively. However, as will often happen in a preferred embodiment, when a high pass quadrant result is found to be below the threshold value, that result is small enough to discard. In that event a zero is substituted as shown in FIG. 7 by the "Set to zero" blocks 715, 716 and 717. This provides the advantage of saving the 4-point DCT computational time which in a preferred embodiment constitutes picture detail information which is of little or even no consequence for a given targeted receiving device 26.

The 4-point DCT must be scaled so that when $C_{00}$, $C_{01}$, $C_{10}$, and $C_{11}$ are combined in approximation block 718, the coefficients are compatible with the coefficients which would be obtained from an 8-point DCT. Therefore, the 4-point DCT is defined as:

$$DCT4(U) \equiv \frac{1}{2} D_4 U D_4^T.$$

Where $D_4$ is a 4×4 matrix with the following entries:

$$d_{ij} = k_i \cos\left(\frac{i(2j+1)}{8}\pi\right)$$

where $k_0 = \frac{1}{2}$, and $$k_{i>0} = 1/sqrt(2).$$

With the completion of the 4-point DCT and the assembly of $C_{00}$, $C_{01}$, $C_{10}$ and $C_{11}$ into approximation block 718, quantization of the data is now performed at block 108 utilizing a quantization table.

Figure 8:
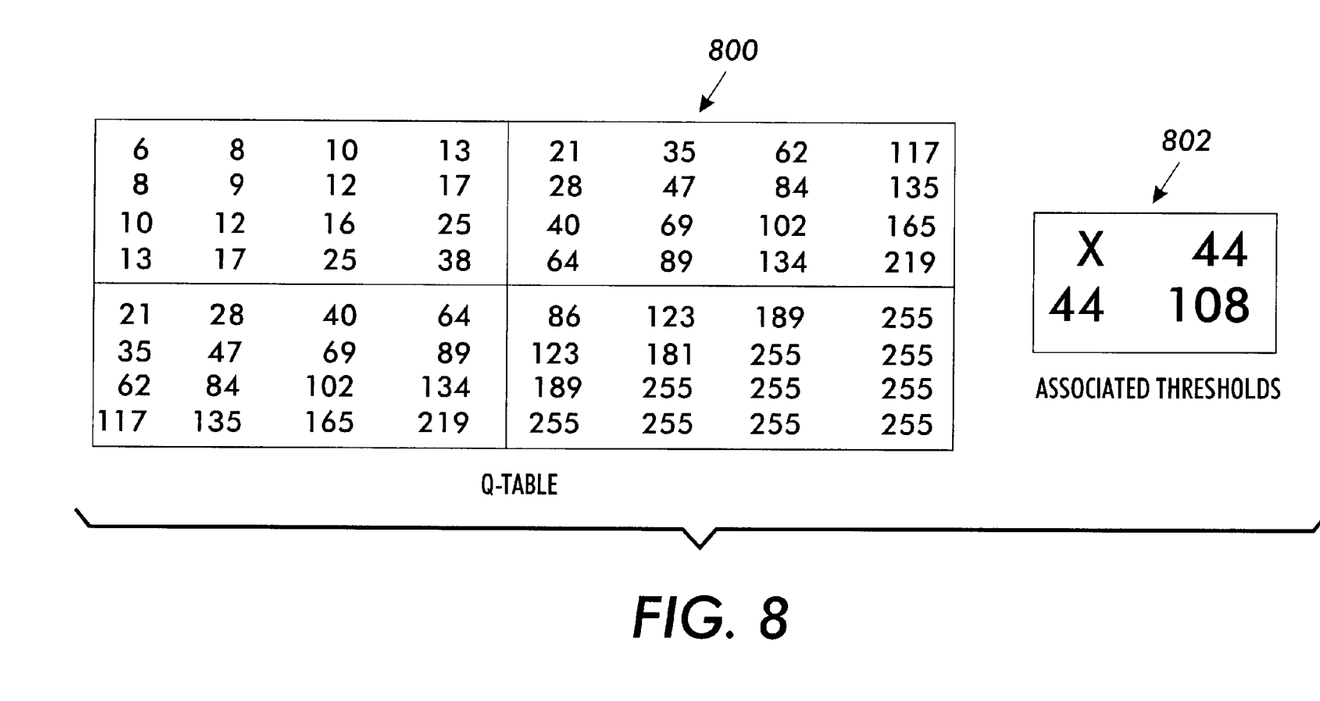
FIG. 8 shows a quantization table and derived threshold table.

Provided in FIG. 8 is a preferred embodiment quantization table 800. As will be well understood by those skilled in the art, this table 800 is but one of many possibilities. It is provided as an example, and as an aid for the explanation of the origin of a preferred embodiment threshold table 802. The values found in threshold table 802 may be developed in many ways. However, for a preferred embodiment threshold table 802 is derived from quantization table 800. To do this an average of the values by quadrant in the quantization table 800 is made to arrive at the values found in the threshold table 802. Because there is no comparison made for $A_{00}$, an "X" is shown as the value for that quadrant. The values shown "44", "44", and "108" are the thresholds for comparison to $A_{01}$, $A_{10}$, and $A_{11}$ respectively, and as stated above are averages from quantization table 800.

Returning to FIG. 7, the remainder of the data processing as described above, is conventional as typified in a JPEG system. As indicated in step 112 a "zigzag" is followed through the 8×8 block of quantized coefficients resulting from step 108 to place the coefficients in a desired order in a one dimensional vector 114. The quantized DCC is typically the first value of the vector 114, and is represented differentially as the actual DCC value minus the DCC of the previous block as performed in block 116. Vector 114 is encoded into a bit stream through a sequence of Run Length Counting (RLC) operations which count the number of zero ACCs that reside in the path before a non-zero ACC. These RLC operations are combined with Variable Length Codes (VLC) as indicated in block 118 which encode a symbol that includes a combination of the number of zeros preceding a non-zero ACC and the ACC amplitude. This encoding produces a compressed data stream which can be transmitted to receiving device 26 over communication lines.

To reiterate the basic steps involved in the invention using nomenclature designations in accord with FIG. 7:

For a given 8×8-pixel block B.
The 4-point DCT is defined as $$DCT4(U) \equiv \frac{1}{2} D_4 U D_4^T.$$

And $D_4$ is a 4×4 matrix with the following entries $$d_{ij} = k_i \cos\left(\frac{i(2j+1)}{8}\pi\right)$$

where $k_0 = \frac{1}{2}$ and $k_{i>0} = 1/sqrt(2)$
Divide B into 4 sub-blocks of 4×4 pixels each. As $$B = \begin{pmatrix} B_{00} & B_{01} \\ B_{10} & B_{11} \end{pmatrix}.$$

Create new blocks of samples (Haar transform) as:

$A_{00} = B_{00} + B_{01} + B_{10} + B_{11}$ $A_{01} = B_{00} - B_{01} + B_{10} - B_{11}$ $A_{10} = B_{00} + B_{01} - B_{10} - B_{11}$ $A_{11} = B_{00} - B_{01} - B_{10} + B_{11}$

And create yet another sub-block $C_{00} = DCT4(A_{00})$
For given thresholds $T_{01}$, $T_{10}$, $T_{11}$:
If any element in $A_{01}$ is greater than $T_{01}$ then make $C_{01} = DCT4(A_{01})$, otherwise make $C_{01} = 0$.
If any element in $A_{10}$ is greater than $T_{10}$ then make $C_{10} = DCT4(A_{10})$, otherwise make $C_{10} = 0$.
If any element in $A_{11}$ is greater than $T_{11}$ then make $C_{11} = DCT4(A_{11})$, otherwise make $C_{11} = 0$.
Compose the matrix with the transformed samples as $$C = \begin{pmatrix} C_{00} & C_{01} \\ C_{10} & C_{11} \end{pmatrix}$$

A preferred embodiment as described above utilizing Haar transformation and 4-point DCT is exemplary for the greater processing speed it realizes by reducing the total processing complexity. Counting addition's, multiplication's, compares (to zero), shifts, etc. as one operation (op), the total complexity for the 8×8 2D DCT is 768 ops assuming separable fast algorithms. Using the same algorithm for the 4×4 2D DCT the complexity is 112 ops. The total complexity for the proposed transform is 336+112n ops, where n is the number of active high-frequency bands (0,1,2,3), i.e. bands above the threshold. For a given image, the average complexity per block is $336 + 112\bar{n}$, where $\bar{n}$ is the average value of n. Compared to the full DCT, the relative complexity is $C(\bar{n}) = 0.4375 + 0.1458\bar{n}$, therefore:

$$0.437 \leq C(\bar{n}) \leq 0.875$$

In other words, in the best case the complexity is less than half of that of the DCT and in the worst case it is at least 12.5% less that the DCT.

While the application of a preferred embodiment to a JPEG compression framework will yield faster processing, it is not identical to the implementation used in the JPEG standard and thus there is some small loss of detail information. This loss in a color facsimile system is of small consequence in budget situations and the compression ratio achieved is very similar to the one achieved by using a regular DCT. However, there are actually two options on the decompression side. First, if the decoder is a standard JPEG decoder, it may not know how to use the proposed transform. The image in that situation is still decompressed but of course using the regular JPEG 8-point DCT. For high compression ratios there is virtually no loss of quality. As the compression ratio decreases, small ringing (jagged) artifacts may appear near sharp edges. These artifacts are light in intensity and may or may not be noticeable in a printing environment. In a cost benefit analysis this has been determined to be an acceptable trade-off for the increased processing speed. In the preferred alternative, it is conveyed to the receiver information that such a transform, as described in the present invention has been used. A smart de-compressor is therein provided which is will then use the inverse transform of the present invention (inverse 4×4 DCTs and inverse Haar). The image quality and compression ratios in this case are then about the same as those obtained by using a regular DCT-JPEG.

It is, therefore, apparent that there has been provided in accordance with the present invention, a method and apparatus for fast compression of JPEG files. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of improving the speed and efficiency of electronic data compression, comprising:

obtaining input image data which includes discrete values that represent light intensity in an image;

applying a first transform to the input image data to produce a first transform result;

comparing the first transform result to a threshold;

applying a second transform to the first transform result to generate approximation data, if the first transform result has a pre-selected relationship to the threshold; and substituting a zero value for the first transform result to generate approximation data, if the first transform result does not have the pre-selected relationship to the threshold.

2. The method of claim 1 wherein the step of applying the first transform comprises using a Haar transform.

3. The method of claim 1 wherein the step of applying the second transform comprises using a scaled four point discrete cosine transform.

4. The method of claim 1 further comprising deriving output image data from the generated approximation data.

5. The method of claim 4 wherein the deriving step further comprises:

transforming the approximation data into a block of coefficients;

quantizing the block of coefficients;

arranging the quantized block of coefficients into a one dimensional vector; and encoding the one dimensional vector into a bit stream, to produce the output image data.

6. The method of claim 5 wherein the quantizing step comprises using a quantization table.

7. The method of claim 5 wherein the step of comparing comprises using a threshold that is derived from the quantization table.

8. The method of claim 1 wherein the step of obtaining input image data comprises using an input image data block having a matrix which has eight discrete values extending in a horizontal direction and eight discrete values extending in a vertical direction.

9. The method of claim 8 further comprising grouping the discrete values such that sixteen values are included in each input image data sub-block with four of the values extending in a horizontal direction and four of the values extending in a vertical direction, thereby resulting in four input image data sub-blocks in each of the input image data blocks, with two sub-blocks extending in a horizontal direction and two sub-blocks extending in a vertical direction.

10. The method of claim 1 wherein the step of applying the first transform comprises using a matrix sum and difference operation.

11. A method of transmitting a facsimile of an original image from a sending location to a receiving location, comprising:

acquiring the original image and generating digital image data that includes pixel values which represent the light intensity of the original image;

applying a first transform to the input image data to produce a first transform result;

comparing the first transform result to a threshold; applying a second transform to the first transform result to generate approximation data, if the first transform result has a pre-selected relationship to the threshold;

substituting a zero value for the first transform result to generate approximation data, if the first transform result does not have the pre-selected relationship to the threshold; and deriving output image data from the approximation data.

12. The method of claim 11 wherein the step of applying the first transform comprises using a Haar transform.

13. The method of claim 11 wherein the step of applying the first transform comprises using a matrix sum and difference operation.

14. The method of claim 11 wherein the step of applying the second transform comprises using a discrete cosine transform.

15. The method of claim 11 wherein the step of applying the second transform comprises using a scaled four point discrete cosine transform.

16. The method of claim 11 further comprising:

transmitting the output image data to a receiving device; and outputting the digital image data at an output device which communicates with the receiving device.

17. The method of claim 16 wherein the transmitting step comprises conveying that a transform has been used.

18. The method of claim 17 wherein the outputting step comprises outputting the digital image data as a standard JPEG decoder.

19. The method of claim 17 wherein the transmitting step comprises using the receiving device to convey to the output device that a transform has been used, and the output device is provided with a smart de-compressor with a inverse transform which it uses for outputting the digital image data.

20. The method of claim 17 wherein the transmitting step comprises using the receiving device which includes a computer.

21. The method of claim 17 wherein the transmitting step comprises using the receiving device which includes a modem.

22. The method of claim 17 wherein the transmitting step comprises using the receiving device which includes a facsimile machine.

23. The method of claim 11 wherein the deriving step further comprises:

arranging the approximation data into a block of coefficients;

quantizing the coefficient block;

arranging the quantized coefficient block into a one dimensional vector; and encoding the one dimensional vector into a bit stream, to produce the output image data.

24. The method of claim 23 wherein the quantizing step comprises using a quantization table.

25. The method of claim 24 wherein the step of comparing comprises using a threshold that is derived from the quantization table.

* * * * *